United States Patent Office 3,434,803
Patented Mar. 25, 1969

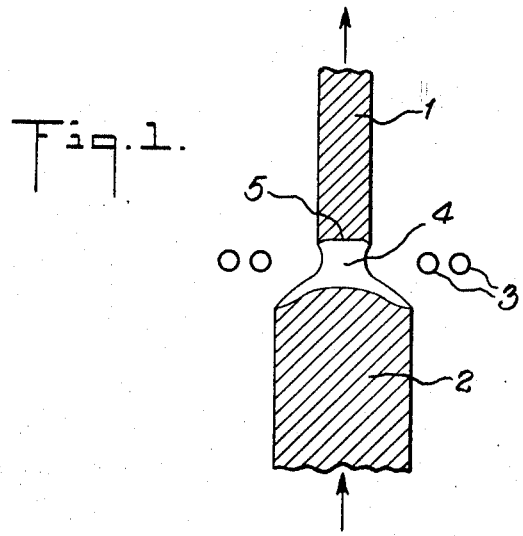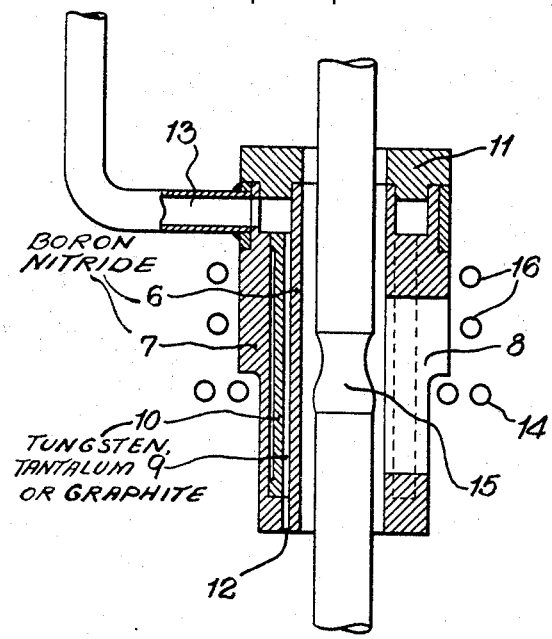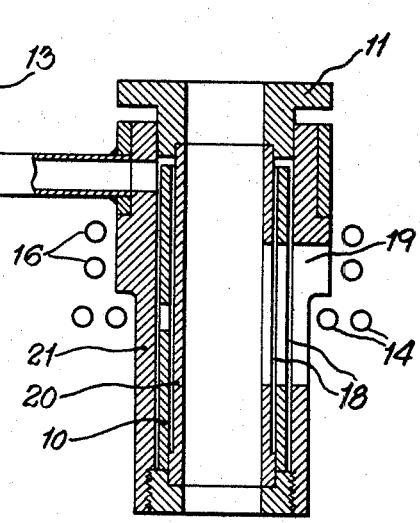

3,434,803
APPARATUS FOR MANUFACTURING FLAWLESS, STRESS-FREE BORON RODS
Heinz Wirth, Uberlingen, Baden-Wurttemberg, and Hermann Helmberger and Hans Herrmann, Munich, Bavaria, Germany, assignors to Consortium fur Elektrochemische Industrie G.m.b.H., Munich, Germany, a corporation of Germany
Filed June 2, 1965, Ser. No. 460,692
Claims priority, application Germany, June 4, 1964, C 33,044
Int. Cl. C01b 35/00
U.S. Cl. 23—273        2 Claims

ABSTRACT OF THE DISCLOSURE

The apparatus of the invention comprises a pair of spaced concentric boron nitride cylinders the inner one of which is a housing for the rod to be drawn, a heating cylinder mounted in the annular space between said boron nitride cylinders, means for heating said heating cylinder, and means for circulating an inert rinsing gas in the space between said boron nitride cylinders and said heating cylinder.

This invention relates to manufacturing flawless, stress-free rods of extremely pure crystalline boron from the melt, and it has for its object to provide a novel and improved apparatus for this purpose.

Another object of the invention is to control the radiation of heat from the plastic region bordering on the solidification front of a boron rod during the crystal drawing thereof, in such a way as to prevent the formation of stresses and cracks in said rod.

Still another object is to effectively suppress heat radiation from the plastic region of a boron rod during the crucible-free zone drawing of such a rod, or to compensate the loss of energy due to heat radiation from such region of the rod, and thereby prevent the development of thermal stresses which have heretofore led to the formation of cracks in rods of this type.

Rods of highly pure boron can be drawn from the melt according to various known processes. For instance, drawing from the crucible as per Czochralski is useful, where crucibles made of very pure boron nitride can be used, or crucibles that are cooled as described for instance in "Metallurgia" 67 (1963) pp. 301–307.

The highest purities, however, can be obtained by the crucible-free zone melting process. There the high temperatures needed for melting the boron at over 2000° C. are produced by a very simple method with inductive heating by means of a high frequency coil, through electron bombardment, or by an electric arc.

However, it has been found that boron rods made by these methods are mostly cracked. These cracks are the more numerous and more pronounced, the larger the diameter of the drawn rod is. These flaws in many cases are obstacles to using boron, for instance in the form of small discs for electronic purposes, and they complicate the creation of larger monocrystals.

In the melting process one can distinguish three rod regions characterized by their temperatures, namely the region of the pure melt where the semi-conductor substance is completely liquid, and, separated therefrom by a solidification front, a so-called plastic rod region, followed by an elastic region.

The object of the present invention is the manufacture of flawless crystalline boron rods according to one of the known crystal drawing processes, characterized by the fact that the heat radiation from the rod surface is largely suppressed in the plastic rod region bordering on the solidification front, either by a shielding device heated to over 1500° C., or by compensating the loss of energy due to heat radiation by supplying heating energy within the plastic rod region.

If one wants to prevent the development of thermal stresses which finally lead to cracks by exceeding the solidity of the material, then a uniform temperature must prevail within the plastic region bordering on the solidification front at each plane normal to the rod axis. This requirement must be fulfilled to such a distance from the solidification front where the rod temperature has fallen off so far that only elastic deformation, but no plastic deformation takes place. By examining the shape of the phase border surface, i.e. the solidification front of the rod, it was found that these conditions cannot be fulfilled by the customary crystal drawing technique alone.

The invention is described in connection with the accompanying drawings, in which:

FIG. 1 is a diagrammatic view illustrating a boron rod in the course of crucible-free inductive zone drawing;

FIG. 2 is a diagrammatic view illustrating a process and apparatus employing a shielding device which prevents polution of the atmosphere, and hence of the boron rod, while drawing the boron rod according to the present invention;

FIG. 3 is a view similar to FIG. 2 but illustrating a modification of the invention;

Figure 4:
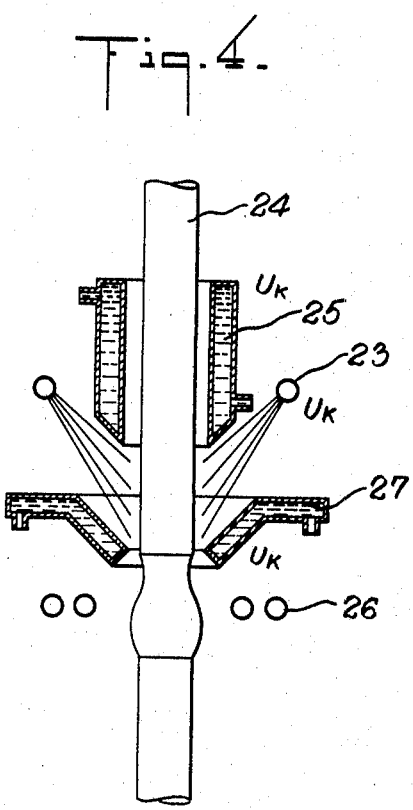
FIG. 4 is a diagrammatic view illustrating a process and apparatus for after-heating the plastic part of the boron rod in a high vacuum.

Since it is well known to manufacture rods of highly pure substances with semiconductor properties by zone drawing without using a crucible, as for instance in H. Jacob Patent No. 3,157,537, issued Nov. 17, 1964, our drawings show only so much of the zone drawing apparatus as is necessary to an understanding of the present invention.

FIG. 1 illustrates by way of example the conditions as they arise during the crucible-free zone drawing of boron rods with inductive heating. A thin rod 1 is drawn from a thicker rod 2 by moving rod 1 relative to induction heating coil 3 in an upward direction faster than rod 2 is moved. Naturally, by changing the speed conditions rod 1 can also be drawn in comparison with rod 2 at an equal or greater diameter, and the direction of drawing can also be reversed, downwardly instead of upwardly.

The shape of the melting point isothermals is decisive for the creation of thermal stresses. These isothermals are geometrically similar to the profile of the solidification front 5 bordering on the melt 4, and also the shape of the isothermals in the plastic region bordering on the solidification front. If these profiles are curved, as is unavoidable in the case of boron due to the high radiation from the rod surface area, the contraction will be different during localized cooling and cracks will develop due to the thermal stresses. However, if one prevents, as per the present invention, the radiation, or if one compensates the heat energy radiation by each surface element of the rod surface in the plastic region by additional heating which replaces the lost amount of energy, one obtains even isothermals and thus stress-free rods.

In order to reduce the heat radiation effectively, the surface surrounding and shielding the rod should have a temperature of at least 1500° C. but even better, a temperature close to 2000° C.

At these temperatures all electrically conducting materials in question already have an appreciable vapor pressure. Moreover, the shielding or screening surface is being hit by boron particles vaporizing upward from the melt, and together with these it forms alloys with vapor pressures that are even higher. This applies to all high-melting metals and also to graphite and carbon. Shielding cylinders of non-conducting materials can be heated capacitively only at proportionately great expense.

In order to prevent any pollution of the atmosphere in the drawing apparatus, and thus of the boron rod itself, we use a shielding device as per FIG. 2 or 3 which show examples of such arrangements. According to the invention, we use a heating cylinder made of a high-melting metal, e.g. tungsten, tantalum or graphite, in the space between two concentrically arranged boron nitride cylinders, and it is heated to a temperature above 1500° C. either by induction or by direct passage of current, while the space between the heating cylinder and the two boron nitride cylinders is rinsed with inert gas.

According to FIG. 2, two concentrically arranged boron nitride cylinders 6 and 7 have been worked from one piece of boron nitride and equipped with an observation slit 8. The graphite heating cylinder 10, equipped with a suitable slit, is inserted into a ring-shaped milled recess 9, and the whole is closed by the lid 11. Fresh inert gas enters through a series of drilled holes 12, streaming along the heating cylinder 10 and upward. The gas carries along with it the vaporizing particles and withdraws them through the pipe 13 from the drawing apparatus. Thus any contamination of the atmosphere in the recipient is largely excluded by the particles of the heating cylinder 10. Instead of the graphite heating cylinder one can use in the same manner cylinders of carbon or high-melting metals like tungsten or tantalum, or one uses rods of these materials joined together in the annular slit between the boron nitride cylinders. It is important that the heating cylinder 10 is not in contact with cylinders 6 and 7 in a temperature range where a reaction with boron nitride might occur. The induction coil 14 serves for creating the melting zone 15, but it also heats the heating cylinder 10 of the shielding device in part or in its entirety. If necessary, the heating cylinder can be additionally heated by another induction coil 16 or by passage of current directly.

It is particularly advantageous to use, for a shielding device of boron nitride as per FIG. 2, a heating cylinder of boron, where the boron can also be molten during operation. Such an arrangement most certainly prevents any introduction of contaminants and no rinsing with inert gas is necessary, so that one can also work in a vacuum. It is easy to make the boron ring by filling the space between the boron nitride cylinders with boron rods and heating them subsequently by induction, thus melting them into a ring. Since in its cold state boron is practically non-conducting electrically, it is necessary to pre-heat the boron rods and/or the boron ring by a molybdenum ring temporarily placed over the shielding device and heated by the same induction coil, to such an extent that the electrical conductivity is sufficient for inductive heating.

The arrangement in FIG. 3 is basically different from the arrangement in FIG. 2 due to the fact that the inert gas enters through the apertures 18 in the side walls of the observation slit 19, thus streaming around the heating cylinder not axially, but around its circumference. Moreover, the two boron nitride cylinders 20 and 21 are separated or detached from each other, so that the inner cylinder 20 which is occasionally damaged by contacting the melting zone, can easily be replaced.

In order to prevent a temperature drop in the peripheral layer close to the surface of the plastic region of the rod, it is not necessary to suppress the radiation. This is only one possibility. Another is to equalize the radiated heat by supplying heat energy to the rod surface. However, the manner of heating there must be such that the heating energy is actually absorbed only within a very thin surface layer. For instance, when post-heating the plastic surface layer. For instance, when post-heating the plastic rod region by an induction coil alone, the stress cracks in the drawn rods are not eliminated if, as in the case of boron, the penetration depth of the induction currents is too great. The penetration depth ϵ (cm.) is computed approximately from the formula:

$$\delta = \frac{1}{2 \cdot \pi} \sqrt{\frac{S}{f}} \cdot 10^9$$

where $S$ is the specific resistance of the inductively heated rod in ohms and $f$ is the heating frequency in cycles. Highly pure boron near the melting temperature has a specific resistance of about $2 \times 10^{-3}$ ohms cm. which rises very quickly as the temperature falls. If one considers further that for larger capacities high-frequency generators can be manufactured economically only up to 5 megacycles, then from the above equation one computes a minimum penetration depth of 1 mm. for the induction currents for boron. This penetration depth is too large for lowering effectively the radial temperature gradient in the border layer.

FIG. 4 shows an arrangement which is suitable for after-heating, in a high vacuum, the plastic part of the boron rod. There is an equal voltage $U_K$ between a ring-shaped cathode 23 heated to about 1000° C. and made of a high-melting metal like tungsten, and the boron rod 24. The boron rod is shielded in the region of the cathode by the water-cooled cylinder 25 which likewise has the potential $U_K$. Thus the electrons emitted by the cathode hit the part of the boron rod which is above the melting zone, where heat is produced in the surface by the electron bombardment. The heat necessary for forming the melting zone can be produced again in the known manner by inductive heating by the induction coil 26 which is shielded against the cathode again by means of the cooled metal ring 27, or also by electron bombardment.

By the height differential between the hot cathode and the melting zone one assures that the cathode is hit by only few or none of the boron particles rising with the vapor from the melt and which would precipitate on the cathode and thus reduce the emission.

Figure 5:
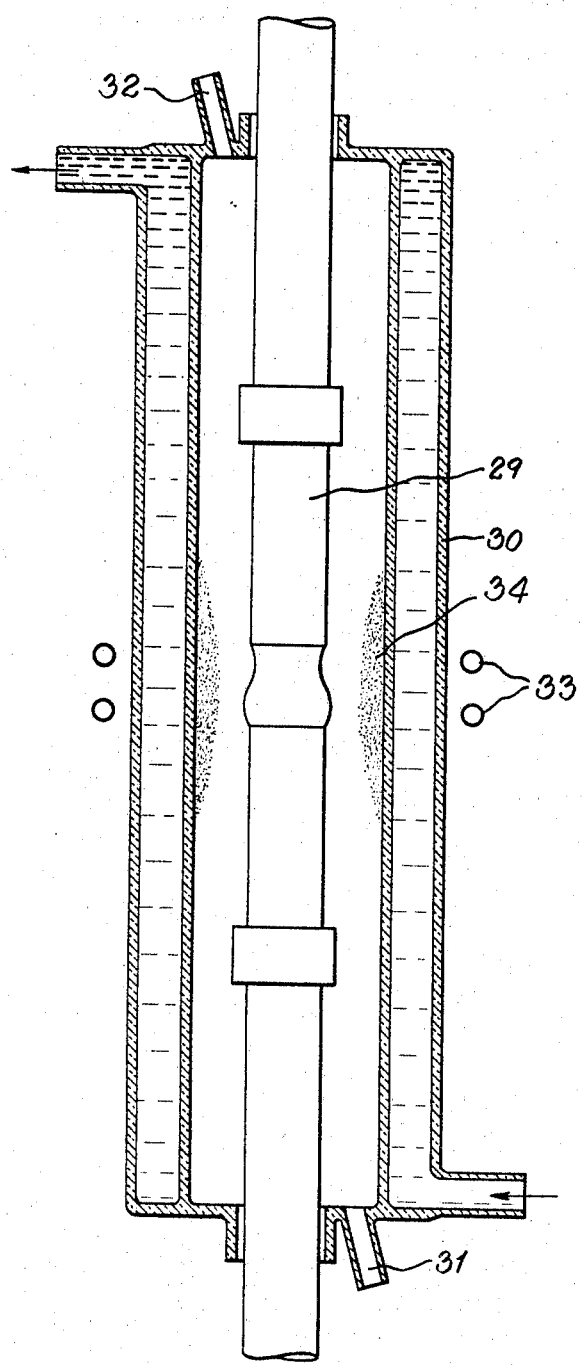
FIG. 5 is a diagrammatic view illustrating a modification of the invention.

Another arrangement for heating suitable for carrying out the invention is shown in FIG. 5. In this case, the boron rod 29 is in a double-walled quartz vessel 30 whose walls are water-cooled. Through the feed pipe 31 one introduces argon or a mixture of argon and hydrogen in a quantity of 5–50 l./min. The gas leaves the vessel through the connecting pipe 32. Outside the vessel is a high-frequency induction coil 33 which is supplied with a frequency of 1–5 megacycles. In part the boron rod is heated directly, in part a high-temperature gas plasma zone 34 is produced by the ring-shaped electrical field created inside the vessel, surrounding the rod and supplying heat not only to the melting zone, but also to the bordering rod parts, thus effecting the post-heating in the desired manner. If the boron rod is grounded, the gas plasma zone is created by the electrical field which is now radial, i.e. capacitive.

The invention claimed is:

1. Apparatus for the crucible-free zone drawing of highly pure boron rods which comprises a pair of spaced concentric boron nitride cylinders the inner one of which is a housing for the rod to be drawn, a heating cylinder of a material selected from the group consisting of graphite, tungsten and tantalum mounted in the annular space between said boron nitride cylinders, induction coil means for heating said heating cylinder to a temperature of at least 1500° C., and means for circulating an inert rinsing gas in the space between said boron nitride cylinders and said heating cylinder.

2. Apparatus according to claim 1, in which the heating cylinder is composed of boron rods melted together in the form of a ring.

References Cited

UNITED STATES PATENTS

| | | | |
|---|---|---|---|
| 2,902,583 | 9/1959 | Steigerwald | 148—1.5 |
| 2,990,261 | 6/1961 | Greiner | 23—301 |
| 3,096,158 | 7/1963 | Gaule | 23—273 |
| 3,154,384 | 10/1964 | Jones | 23—273 |
| 3,228,756 | 1/1966 | Hergenrother | 23—301 |

FOREIGN PATENTS 1,198,322   5/1961   Germany.

NORMAN YUDKOFF, *Primary Examiner.*

U.S. Cl. X.R.

23—301